(12) United States Patent
Glasco et al.

(10) Patent No.: US 8,700,883 B1
(45) Date of Patent: Apr. 15, 2014

(54) MEMORY ACCESS TECHNIQUES PROVIDING FOR OVERRIDE OF A PAGE TABLE

(75) Inventors: David B. Glasco, Austin, TX (US); John S. Montrym, Los Altos Hills, CA (US)

(73) Assignee: Nvidia Corporation, Santa Clara, CA (US)

( * ) Notice: Subject to any disclaimer, the term of this patent is extended or adjusted under 35 U.S.C. 154(b) by 218 days.

(21) Appl. No.: 11/586,756

(22) Filed: Oct. 24, 2006

(51) Int. Cl.
*G06F 12/00* (2006.01)
*G06F 13/00* (2006.01)
*G06F 13/28* (2006.01)

(52) U.S. Cl.
USPC ............................ 711/220; 711/202; 712/228

(58) Field of Classification Search
USPC .................... 711/202, 220; 712/228
See application file for complete search history.

(56) References Cited

U.S. PATENT DOCUMENTS

| | | | |
|---|---|---|---|
| 3,815,101 A * | 6/1974 | Boss et al. ................... | 711/220 |
| 3,950,729 A | 4/1976 | Fletcher et al. | |
| 4,654,790 A * | 3/1987 | Woffinden ................... | 711/207 |
| 4,797,814 A * | 1/1989 | Brenza ............................ | 711/3 |
| 4,812,981 A | 3/1989 | Chan et al. | |
| 5,123,094 A | 6/1992 | MacDougall | |
| 5,179,669 A | 1/1993 | Peters | |
| 5,245,702 A | 9/1993 | McIntyre et al. | |
| 5,278,962 A | 1/1994 | Masuda et al. | |
| 5,414,824 A | 5/1995 | Grochowski | |
| 5,446,854 A | 8/1995 | Khalidi et al. | |
| 5,526,504 A | 6/1996 | Hsu et al. | |
| 5,649,102 A | 7/1997 | Yamauchi et al. | |
| 5,649,184 A | 7/1997 | Hayashi et al. | |
| 5,696,925 A | 12/1997 | Koh | |
| 5,949,785 A | 9/1999 | Beasley | |
| 5,963,984 A | 10/1999 | Garibay et al. | |
| 5,999,189 A | 12/1999 | Kajiya et al. | |
| 6,012,132 A | 1/2000 | Yamada et al. | |
| 6,297,832 B1 | 10/2001 | Mizuyabu et al. | |
| 6,298,390 B1 | 10/2001 | Matena et al. | |
| 6,362,826 B1 | 3/2002 | Doyle et al. | |
| 6,457,115 B1 | 9/2002 | McGrath | |
| 6,470,428 B1 | 10/2002 | Milway et al. | |
| 6,499,090 B1 | 12/2002 | Hill et al. | |
| 6,549,997 B2 * | 4/2003 | Kalyanasundharam ...... | 711/207 |
| 6,636,223 B1 | 10/2003 | Morein | |

(Continued)

FOREIGN PATENT DOCUMENTS

| | | |
|---|---|---|
| JP | 02288927 | 11/1990 |
| JP | 03054660 | 3/1991 |
| JP | 04185858 | 6/1992 |

OTHER PUBLICATIONS

Harper et al., (Rapid recovery from transient Faults in the fault tolerant processor with fault-tolerant shared memory) 1990, IEEE, p. 350-359.

(Continued)

*Primary Examiner* — Stephen Elmore
*Assistant Examiner* — Mark A Giardino, Jr.

(57) ABSTRACT

A memory access technique that provides for overriding a translation lookaside buffer and page table data structure, in accordance with one embodiment of the present invention, includes selectively translating a virtual address directly to a physical address utilizing an adjustment in a context specifier, or translating the virtual address to the physical address utilizing a translation lookaside buffer or page table data structure.

20 Claims, 9 Drawing Sheets

(56) References Cited

U.S. PATENT DOCUMENTS

| | | | |
|---|---|---|---|
| 6,658,538 | B2 | 12/2003 | Arimilli et al. |
| 6,742,104 | B2 | 5/2004 | Chauvel et al. |
| 6,813,699 | B1 | 11/2004 | Belgard |
| 6,823,433 | B1 | 11/2004 | Barnes et al. |
| 6,839,813 | B2 | 1/2005 | Chauvel |
| 6,859,208 | B1 | 2/2005 | White |
| 6,877,077 | B2 | 4/2005 | McGee et al. |
| 6,883,079 | B1 | 4/2005 | Priborsky |
| 7,007,075 | B1 | 2/2006 | Coffey |
| 7,082,508 | B2 | 7/2006 | Khan et al. |
| 7,107,411 | B2 | 9/2006 | Burton et al. |
| 7,120,715 | B2 | 10/2006 | Chauvel et al. |
| 7,159,095 | B2 | 1/2007 | Dale et al. |
| 7,194,597 | B2 | 3/2007 | Willis et al. |
| 7,234,038 | B1 | 6/2007 | Durrant |
| 7,275,246 | B1 | 9/2007 | Yates, Jr. et al. |
| 7,401,358 | B1 | 7/2008 | Christie et al. |
| 7,447,869 | B2 | 11/2008 | Kruger et al. |
| 7,519,781 | B1 | 4/2009 | Wilt |
| 7,545,382 | B1 | 6/2009 | Montrym et al. |
| 7,730,489 | B1 | 6/2010 | Duvur et al. |
| 2002/0004823 | A1 | 1/2002 | Anderson et al. |
| 2002/0013889 | A1 | 1/2002 | Schuster et al. |
| 2002/0169938 | A1 | 11/2002 | Scott et al. |
| 2002/0172199 | A1 | 11/2002 | Scott et al. |
| 2003/0014609 | A1 | 1/2003 | Kissell |
| 2003/0167420 | A1 | 9/2003 | Parsons |
| 2003/0196066 | A1 | 10/2003 | Mathews |
| 2003/0236771 | A1 | 12/2003 | Becker |
| 2004/0025161 | A1 | 2/2004 | Chauvel et al. |
| 2004/0054833 | A1 | 3/2004 | Seal et al. |
| 2004/0078778 | A1 | 4/2004 | Leymann et al. |
| 2004/0153350 | A1 | 8/2004 | Kim et al. |
| 2004/0193831 | A1 | 9/2004 | Moyer |
| 2004/0215918 | A1 | 10/2004 | Jacobs et al. |
| 2004/0268071 | A1 | 12/2004 | Khan et al. |
| 2005/0050013 | A1 | 3/2005 | Ferlitsch |
| 2005/0097280 | A1 | 5/2005 | Hofstee et al. |
| 2005/0268067 | A1 | 12/2005 | Lee et al. |
| 2006/0004984 | A1 | 1/2006 | Morris et al. |
| 2006/0069879 | A1 | 3/2006 | Inoue et al. |
| 2006/0069899 | A1* | 3/2006 | Schoinas et al. ............. 711/206 |
| 2006/0187945 | A1 | 8/2006 | Andersen |
| 2006/0195683 | A1 | 8/2006 | Kissell |
| 2006/0230223 | A1 | 10/2006 | Kruger et al. |
| 2006/0259732 | A1 | 11/2006 | Traut et al. |
| 2006/0259825 | A1 | 11/2006 | Cruickshank et al. |
| 2006/0282645 | A1 | 12/2006 | Tsien |
| 2006/0288174 | A1 | 12/2006 | Nace et al. |
| 2007/0067505 | A1 | 3/2007 | Kaniyur et al. |
| 2007/0073996 | A1 | 3/2007 | Kruger et al. |
| 2007/0106874 | A1 | 5/2007 | Pan et al. |
| 2007/0126756 | A1 | 6/2007 | Glasco et al. |
| 2007/0157001 | A1 | 7/2007 | Ritzau |
| 2007/0168643 | A1 | 7/2007 | Hummel et al. |
| 2008/0263284 | A1 | 10/2008 | da Silva et al. |

OTHER PUBLICATIONS

Ooi, (Fault Tolerant Architecture in a cache memory control LSI), 1992, IEEE, 507-514.
Oracle, (Oracle 8i Parallel server), 1999, Oracle, Release 2 (8.1.6) 1-216.
Shalan. (Dynamic Memory Management for embedded real-time multiprocessor system on a chip), 2000, ACM. 180-186.
Shalan. (Dynamic Memory Management for embedded real-time multiprocessor system on a chip), 2003, Georgia Inst. Of Tech. 1-118.
Wikipedia, Memory Address, Oct. 29, 2010, pp. 1-4, www.wikipedia.com.
Wikipedia, Physical Address, Apr. 17, 2010, pp. 1-2, www.wikipedia.com.
Final Office Action; Mail Date Nov. 20, 2009; U.S. Appl. No. 11/591,685; Filing Date Nov. 1, 2006; Inventors: Glasco et al.
Non-Final OA Dated May 28, 2009; U.S. Appl. No. 11/523,830; Filing Date Sep. 19, 2006; Inventors: Glasco et al.
Non-Final OA Dated Sep. 15, 2008; U.S. Appl. No. 11/523,830; Filing Date Sep. 19, 2006; Inventors: Glasco et al.
Non-Final OA Dated Aug. 19, 2009; U.S. Appl. No. 11/591,857; Filing Date Nov. 1, 2006; Inventors: Glasco et al.
Final OA Dated Nov. 23, 2009; U.S. Appl. No. 11/592,106; Filing Date Nov. 1, 2006; Inventors: Glasco et al.
Non-Final OA Dated Apr. 1, 2009; U.S. Appl. No. 11/592,106; Filing Date Nov. 1, 2006; Inventors: Glasco et al.
Non-Final OA Dated Oct. 29, 2008; U.S. Appl. No. 11/523,950; Filing Date: Sep. 19, 2006; Inventors: Glasco et al.
Notice of Allowance Dated Dec. 24, 2009; U.S. Appl. No. 11/523,950; Filing Sep. 19, 2006; Inventors: Glasco et al.
Notice of Allowance dated Sep. 3, 2009; U.S. Appl. No. 11/523,950; Filing date: Sep. 19, 2006; Inventors: Glasco et al.
Notice of Allowance Dated Dec. 24, 2009; U.S. Appl. No. 11/523,950; Filing Date: Sep. 19, 2006; Inventors: Glasco et al.
Non-Final OA dated Dec. 16, 2008; U.S. Appl. No. 11/586,826; Filing date: Oct. 24, 2006; Inventor: Lingfeng Yuan.
Non-Final OA dated Feb. 17, 2009; U.S. Appl. No. 11/592,819; Filing Date: Nov. 2, 2006; Inventors; Van Dyke et al.
Final OA Dated Nov. 9, 2009; U.S. Appl. No. 11/591,629; Filing Date: Nov. 1, 2006; Inventors: Glasco et al.
Non-Final OA Dated Feb. 20, 2009; U.S. Appl. No. 11/591,629; Filing Date: Nov. 1, 2006; Inventors: Glasco et al.
Final OA Dated Nov. 24, 2009; U.S. Appl. No. 11/592,780; Filing Date: Nov. 3, 2006; Inventors: Glasco et al.
Non-Final OA Dated Apr. 2, 2009; U.S. Appl. No. 11/592,780; Filing Date: Nov. 3, 2006; Inventors: Glasco et al.
Non-Final OA Dated Sep. 24, 2009; U.S. Appl. No. 11/588,177; Filing Date: Oct. 24, 2006; Inventors: Glasco et al.
Final OA Dated May 21, 2009; U.S. Appl. No. 11/588,177; Filing Date: Oct. 24, 2006; Inventors: Glasco et al.
Non-Final OA Dated Nov. 13, 2008; U.S. Appl. No. 11/588,177; Filing Date: Oct. 24, 2012; Inventors: Glasco et al.
Final OA Dated Dec. 8, 2009; U.S. Appl. No. 11/591,856; Filing Date: Nov. 1, 2006; Inventor; Lingfeng Yuan.
Non-Final OA Dated May 11, 2009; U.S. Appl. No. 11/591,856; Filing Date: Nov. 1, 2006; Inventor: Lingfeng Yuan.
Final OA Dated Oct. 14, 2009; U.S. Appl. No. 11/586,825; Filing Date: Oct. 24, 2006; Inventors: Glasco et al.
Non-Final OA Dated Mar. 18, 2009; U.S. Appl. No. 11/586,825; Filing Date: Oct. 24, 2006; Inventors: Glasco et al.
Non Final Office Action; Mail Date Apr. 27, 2009; U.S. Appl. No. 11/591,685; Filing Date: Nov. 1, 2006; Inventors: Glasco et al.
Final Office Action; Mail Date Mar. 16, 2010; U.S. Appl. No. 11/523,830; Filing Date: Sep. 19, 2006; Inventors: Glasco et al.
Restriction Requirement; Mail Date Apr. 27, 2009; U.S. Appl. No. 11/591,857; Filing Date: Nov. 1, 2006; Inventors: Glasco et al.
Notice of Allowance; Mail Date Jun. 22, 2009; U.S. Appl. No. 11/586,826; Filing Date: Oct. 24, 2006; Inventor: Lingfeng Yuan.
Notice of Allowance; Mail Date Dec. 14, 2009; U.S. Appl. No. 11/586,826; Filing Date: Oct. 24, 2006; Inventor: Lingfeng Yuan.
Non Final OFfice Action; Mail Date Mar. 17, 2010; U.S. Appl. No. 11/592,819; Filing date: Nov. 2, 2006, Inventors: Van Dyke et al.
Notice of Allowance; Mail Date Jan. 19, 2010; U.S. Appl. No. 11/592,819; Filing Date: Nov. 2, 2006; Inventors:Van Dyke et al.
Non Final Office Action; Mail Date Feb. 22, 2010; U.S. Appl. No. 11/586,825; Filing Date: Oct. 24, 2006; Inventors: Glasco et al.
Chaudhuri, "T he impact of NACKs in shared memory scientific applications", Feb. 2004, IEEE, IEEE Transactions on Parallel and distributed systems vol. 15, No. 2, p. 134-150.
Laibinis, "Formal Development of Reactive Fault Tolerant Systems", Sep. 9, 2005, Springer, Second International Workshop, RISE 2005, p. 234-249.
Osronline, (The Basics: So what is a page fault?), http://www.osronline.com/custom.cfm?name=articlePrint.cfm&id=222, May 2003, p. 1-2.
PCMAG (Definition of: Page fault) www.PCMag.com, 1 Page; Mar. 2009.
Wikipedia, (Page Fault definition) www.wikipedia.com, 1-4.
Notice of Allowance Dated Mar. 17, 2011; U.S. Appl. No. 11/592,076; Applicant Glasco, D.; Filed Nov. 1, 2006.

(56) References Cited

OTHER PUBLICATIONS

Notice of Allowance Dated Jun. 29, 2011; U.S. Appl. No. 11/592,076; Applicant Glasco, D.; Filed Nov. 1, 2006.
Office Action Dated Feb. 1, 2011; U.S. Appl. No. 12/650,068; Applicant Glasco, D.; US Publication No. 20100106921; Publication Date Apr. 29, 2010.
Office Action Dated Aug. 9, 2011; U.S. Appl. No. 12/650,068; Applicant Glasco, D.; US Publication No. 20100106921; Publication Date Apr. 29, 2010.
Notice of Allowance Dated Jul. 21, 2011; U.S. Appl. No. 11/523,830; Applicant Glasco, D.; Filed Sep. 19, 2006.
Notice of Allowance Dated Aug. 25, 2011 U.S. Appl. No. 11/586,756; Applicant Glasco, D.; Filed Oct. 24, 2006.
Office Action Dated May 4, 2010; U.S. Appl. No. 11/592,076; Applicant Glasco, D.; Filed Nov. 1, 2006.
Office Action Dated Jul. 5, 2011 U.S. Appl. No. 11/592,106; Applicant Glasco, D.; Filed Nov. 1, 2006.
Office Action Dated Sep. 15, 2008 U.S. Appl. No. 11/523,926; Applicant Glasco, D.; Filed Sep. 19, 2006.
Office Action Dated Apr. 10, 2009 U.S. Appl. No. 11/523,926; Applicant Glasco, D.; Filed Sep. 19, 2006.
Office Action Dated Oct. 1, 2009 U.S. Appl. No. 11/523,926; Applicant Glasco, D.; Filed Sep. 19, 2006.
Notice of Allowance Dated Mar. 29, 2010 U.S. Appl. No. 11/523,926; Applicant Glasco, D.; Filed Sep. 19, 2006.
Notice of Allowance Dated Jul. 9, 2010 U.S. Appl. No. 11/523,926; Applicant Glasco, D.; Filed Sep. 19, 2006.
Notice of Allowance Dated Oct. 27, 2010 U.S. Appl. No. 11/523,926; Applicant Glasco, D.; Filed Sep. 19, 2006.
Notice of Allowance Dated Feb. 3, 2011 U.S. Appl. No. 11/523,926; Applicant Glasco, D.; Filed Sep. 19, 2006.
Notice of Allowance Dated May 23, 2011 U.S. Appl. No. 11/523,926; Applicant Glasco, D.; Filed Sep. 19, 2006.
Notice of Allowance Dated Aug. 23, 2011 U.S. Appl. No. 11/523,926; Applicant Glasco, D.; Filed Sep. 19, 2006.
Notice of Allowance Dated Jul. 21, 2010 U.S. Appl. No. 11/523,950; Applicant Glasco, D.; Filed Sep. 19, 2006.
Notice of Allowance Dated Nov. 3, 2010 U.S. Appl. No. 11/523,950; Applicant Glasco, D.; Filed Sep. 19, 2006.
Notice of Allowance Dated Jun. 9, 2011 U.S. Appl. No. 11/523,950; Applicant Glasco, D.; Filed Sep. 19, 2006.
Notice of Allowance Dated Aug. 30, 2011 11/523,950; Applicant Glasco, D.; Filed Sep. 19, 2006.
Notice of Allowance Dated Feb. 16, 2011 U.S. Appl. No. 11/586,826; Applicant Yuan, L.; Filed Oct. 24, 2006.
Notice of Allowance Dated Jul. 26, 2011 U.S. Appl. No. 11/586,826; Applicant Yuan, L.; Filed Oct. 24, 2006.
Notice of Allowance Dated Oct. 16, 2009 U.S. Appl. No. 11/592,819; Applicant Van Dyke, J.; Filed Nov. 2, 2006.
Office Action Dated Mar. 17, 2010 U.S. Appl. No. 11/592,819; Applicant Van Dyke, J.; Filed Nov. 2, 2006.
Notice of Allowance Dated Nov. 23, 2010 U.S. Appl. No. 11/592,819; Applicant Van Dyke, J.; Filed Nov. 22, 2006.
Notice of Allowance Dated Apr. 19, 2011 U.S. Appl. No. 11/592,819; Applicant Van Dyke, J.; Filed Nov. 2, 2006.
Notice of Allowance Dated Sep. 7, 2011 U.S. Appl. No. 11/592,819; Applicant Van Dyke, J.; Filed Nov. 2, 2006.
Office Action Dated May 27, 2010 U.S. Appl. No. 11/591,629; Applicant Glasco, D.; Filed Nov. 1, 2006.
Office Action Dated Nov. 3, 2010 U.S. Appl. No. 11/591,629; Applicant Glasco, D.; Filed Nov. 1, 2006.
Office Action Dated Jun. 8, 2011 U.S. Appl. No. 11/591,629; Applicant Glasco, D.; Filed Nov. 1, 2006.
Office Action Dated Apr. 28, 2010 U.S. Appl. No. 11/592,780; Applicant Glasco, D.; Filed Nov. 3, 2006.
Office Action Dated Oct. 13, 2010 U.S. Appl. No. 11/592,780; Applicant Glasco, D.; Filed Nov. 3, 2006.
Office Action Dated Apr. 12, 2011 U.S. Appl. No. 11/592,780; Applicant Glasco, D.; Filed Nov. 3, 2006.
Office Action Dated Apr. 27, 2010 U.S. Appl. No. 11/588,177; Applicant Glasco, D.; Filed Oct. 24, 2006.
Office Action Dated Jun. 7, 2011 U.S. Appl. No. 11/588,177; Applicant Glasco, D.; Filed Oct. 24, 2006.
Office Action Dated Apr. 27, 2010 U.S. Appl. No. 11/591,856; Applicant Yuan, L.; Filed Nov. 1, 2006.
Notice of Allowance Dated Nov. 12, 2010 U.S. Appl. No. 11/591,856; Applicant Yuan, L.; Filed Nov. 1, 2006.
Notice of Allowance Dated Mar. 9, 2011 U.S. Appl. No. 11/591,856; Applicant Yuan, L.; Filed Nov. 1, 2006.
Notice of Allowance Dated Jun. 17, 2011 U.S. Appl. No. 11/591,856; Applicant Yuan, L.; Filed Nov. 1, 2006.
Notice of Allowance Dated Aug. 16, 2010 U.S. Appl. No. 11/586,825; Applicant Glasco, D.; Filed Oct. 24, 2006.
Notice of Allowance Dated Nov. 26, 2010 U.S. Appl. No. 11/586,825; Applicant Glasco, D.; Filed Oct. 24, 2006.
Notice of Allowance Dated Mar. 4, 2011 U.S. Appl. No. 11/586,825; Applicant Glasco, D.; Filed Oct. 24, 2006.
Notice of Allowance Dated Jun. 16, 2011 U.S. Appl. No. 11/586,825; Applicant Glasco, D.; Filed Oct. 24, 2006.
Notice of Allowance Dated Aug. 9, 2011 U.S. Appl. No. 11/586,825; Applicant Glasco, D.; Filed Oct. 24, 2006.
Office Action Dated May 11, 2010; U.S. Appl. No. 11/591,685; Applicant Glasco, D.; Filed Nov. 1, 2006.
Office Action Dated Oct. 27, 2010; U.S. Appl. No. 11/591,685; Applicant Glasco, D.; Filed Nov. 1, 2006.
Office Action Dated Apr. 28, 2009; U.S. Appl. No. 11/592,076; Applicant Glasco, D.; Filed Nov. 1, 2006.
Office Action Dated Aug. 19, 2009; U.S. Appl. No. 11/592,076; Applicant Glasco, D.; Filed Nov. 1, 2006.
Notice of Allowance Dated Jan. 29, 2010; U.S. Appl. No. 11/592,076; Applicant Glasco, D.; Filed Nov. 1, 2006.
Notice of Allowance Dated May 4, 2010; U.S. Appl. No. 11/592,076; Applicant Glasco, D.; Filed Nov. 1, 2006.
Notice of Allowance Dated Aug. 13, 2010; U.S. Appl. No. 11/592,076; Applicant Glasco, D.; Filed Nov. 1, 2006.
Notice of Allowance Dated Nov. 26, 2010; U.S. Appl. No. 11/592,076; Applicant Glasco, D.; Filed Nov. 1, 2006.
Office Action Dated Aug. 10, 2010; U.S. Appl. No. 12/650,068; Applicant Glasco, D.; US Publication No. 20100106921; Publication Date Apr. 29, 2010.
Notice of Allowance Dated Jun. 28, 2010; U.S. Appl. No. 11/523,830; Applicant Glasco, D.; Filed Sep. 19, 2006.
Notice of Allowance Dated Sep. 2, 2010; Application No. 11/523,830; Applicant Glasco, D.; Filed Sep. 19, 2006.
Notice of Allowance Dated Jan. 20, 2011; U.S. Appl. No. 11/523,830; Applicant Glasco, D.; Filed Sep. 19, 2006.
Notice of Allowance Dated May 5, 2011; U.S. Appl. No. 11/523,830; Applicant Glasco, D.; Filed Sep. 19, 2006.
Office Action Dated Jun. 25, 2010 U.S. Appl. No. 11/592,106; Applicant Glasco, D.; Filed Nov. 1, 2006.
Office Action Dated Dec. 16, 2010 U.S. Appl. No. 11/592,106; Applicant Glasco, D.; Filed Nov. 1, 2006.
Office Action Dated Dec. 07, 2010; Application No. 11/591,857; Applicant Glasco, D.; Filed Nov. 01, 2006; Docket No. Nvid-P001956.
Notice of Allowance Dated Mar. 18, 2011; Application No. 11/591,857; Applicant Glasco, D.; Filed Nov. 01, 2006; Docket No. Nvid-P001956.
Office Action Dated May 06, 2011; Application No. 11/591,685; Applicant Glasco, D.; Filed Nov. 01, 2006; Docket No. Nvid-P001951.
Notice of Allowance Dated Jul. 21, 2011; Application No. 11/591,857; Applicant Glasco, D.; Filed Nov. 01, 2006; Docket No. Nvid-P001956.
Guelfi et al., (Rapid Integration of Software Engineering Techniques) 2005, Second International Workshop, 9 pages.
Glasco et al., Notice of Allowance Dated May 30, 2012; U.S. Appl. No. 11/591,685, all pages.
Glasco et al., Final Office Action dated Nov. 16, 2011; U.S. Appl. No. 11/591,685, all pages.
Glasco et al., Notice of Allowance Dated Feb. 22, 2012; U.S. Appl. No. 11/591,685, all pages.

(56) References Cited

OTHER PUBLICATIONS

Glasco et al., Notice of Allowance dated May 10, 2012; U.S. Appl. No. 11/523,830, all pages.
Glasco et al., Notice of Allowance dated Jul. 6, 2012; U.S. Appl. No. 12/650,068, all pages.
Glasco et al., Notice of Allowance Dated May 25, 2012; U.S. Appl. No. 11/591,857, all pages.
Glasco et al., Final Office Action Dated May 10, 2012; U.S. Appl. No. 11/592,106, all pages.
Glasco et al., Final Office Action Dated Jun. 1, 2012; U.S. Appl. No. 11/523,926, all pages.
Lingfeng Yaun, Notice of Allowance Dated Jul. 5, 2012; U.S. Appl. No. 11/586,826, all pages.
Van Dyke et al., Notice of Allowance Dated Jun. 7, 2012; U.S. Appl. No. 11/592,819, all pages.
Glasco et al., Final Office Action Dated May 7, 2012; U.S. Appl. No. 11/592,780, all pages.
Lingfeng Yaun, Notice of Allowance Dated Apr. 12, 2012; U.S. Appl. No. 11/591,856, all pages.
Lingfeng Yaun, Notice of Allowance Dated Jun. 7, 2012; U.S. Appl. No. 11/591,856, all pages.
Glasco et al., Notice of Allowance Dated Jul. 6, 2012; U.S. Appl. No. 11/586,825, all pages.
Glasco et al., Notice of Allowance Dated Oct. 14, 2011; U.S. Appl. No. 11/592,076, all pages.
Glasco et al., Notice of Allowance Dated Jan. 27, 2012; U.S. Appl. No. 11/592,076, all pages.
Glasco et al., Notice of Allowance Dated May 10, 2012; U.S. Appl. No. 11/592,076, all pages.
Glasco et al., Notice of Allowance Dated Oct. 26, 2011; U.S. Appl. No. 11/523,830, all pages.
Glasco et al., Notice of Allowance Dated Feb. 2, 2012; U.S. Appl. No. 11/523,830, all pages.
Glasco et al., Notice of Allowance Dated May 1, 2012; U.S. Appl. No. 12/650,068, all pages.
Glasco et al., Notice of Allowance Dated Oct. 28, 2011; U.S. Appl. No. 11/591,857, all pages.
Glasco et al., Notice of Allowance Dated Feb. 10, 2012; U.S. Appl. No. 11/591,857, all pages.
Glasco et al., Notice of Allowance Dated Oct. 28, 2011; U.S. Appl. No. 11/523,926, all pages.
Glasco et al., Notice of Allowance Dated Feb. 24, 2012; U.S. Appl. No. 11/523,926, all pages.
Glasco et al., Notice of Allowance Dated Nov. 14, 2011; U.S. Appl. No. 11/523,950, all pages.
Lingfeng Yaun, Notice of Allowance Dated Dec. 27, 2011; U.S. Appl. No. 11/586,826, all pages.
Van Dyke et al., Notice of Allowance Dated Dec. 9, 2011; U.S. Appl. No. 11/592,819, all pages.
Lingfeng Yaun, Notice of Allowance Dated Sep. 26, 2011; U.S. Appl. No. 11/591,856, all pages.
Lingfeng Yaun, Notice of Allowance Dated Jan. 5, 2012; U.S. Appl. No. 11/591,856, all pages.
Glasco et al., Notice of Allowance Dated Dec. 8, 2011; U.S. Appl. No. 11/586,825, all pages.
Glasco et al., Notice of Allowance Dated Mar. 21, 2012; U.S. Appl. No. 11/586,825, all pages.
Glasco et al., Final Office Action Dated Dec. 2, 2011; U.S. Appl. No. 11/592,106, all pages.
Final Office Action Dated Nov. 29, 2011; U.S. Appl. No. 11/588,177, all pages.
Non-Final Office Action Dated Nov. 16, 2011; U.S. Appl. No. 12/650,068, all pages.
Glasco et al., Office Action Dated Nov. 1, 2011; U.S. Appl. No. 11/592,780, all pages.
Glasco et al., Notice of Allowance Dated Jul. 21, 2011; U.S. Appl. No. 11/523,830, all pages.
Glasco et al., Notice of Allowance Dated Sep. 26, 2012; U.S. Appl. No. 11/591,685, all pages.

Glasco et al., Notice of Allowance Dated Oct. 12, 2012; U.S. Appl. No. 11/586,825, all pages.
Glasco et al., Notice of Allowance Dated Aug. 29, 2012; U.S. Appl. No. 11/523,830, all pages.
Glasco et al., Notice of Allowance Dated Sep. 18, 2012; U.S. Appl. No. 11/591,857, all pages.
Glasco et al., Office Action Dated Sep. 14, 2012; U.S. Appl. No. 11/591,629, all pages.
Lingfeng Yaun, Notice of Allowance Dated Sep. 17, 2012; U.S. Appl. No. 11/591,856, all pages.
Glasco et al., Notice of Allowance Dated Aug. 16, 2012; U.S. Appl. No. 11/592,076, all pages.
Glasco et al., Notice of Allowance Dated Sep. 17, 2012; U.S. Appl. No. 12/650,068, all pages.
Glasco et al., Notice of Allowance Dated Aug. 29, 2012: U.S. Appl. No. 11/523,830, all pages.
Glasco et al., Notice of Allowance Dated Sep. 14, 2012; U.S. Appl. No. 11/588,177, all pages.
Glasco et al., Notice of Allowance Dated Sep. 12, 2012: U.S. Appl. No. 11/523,926, all pages.
Glasco, et al.; Notice of Allowance Dated Jan. 14, 2013; U.S. Appl. No. 11/591,685, All Pages.
Glasco, et al.; Notice of Allowance Dated Jan. 28, 2013; U.S. Appl. No. 12/650,068, All Pages.
Glasco, et al.; Notice of Allowance Dated May 10, 2013; U.S. Appl. No. 11/523,830, All Pages.
Glasco, et al.; Final Office Action Dated May 4, 2010; U.S. Appl. No. 11/591,857, All Pages.
Glasco, et al.; Notice of Allowance Dated Dec. 31, 2012; U.S. Appl. No. 11/591,857, All Pages.
Glasco, et al.; Notice of Allowance Dated Feb. 1, 2013; U.S. Appl. No. 11/591,857, All Pages.
Glasco, et al.; Office Action Dated Jan. 3, 2013; U.S. Appl. No. 11/592,106, All Pages.
Lingfeng Yuan; Notice of Allowance Dated Feb. 7, 2013; U.S. Appl. No. 11/586,826, All Pages.
Glasco, et al.; Notice of Allowance Dated Apr. 2, 2013; U.S. Appl. No. 11/523,950, All Pages.
Van Dyke, et al.; Notice of Allowance Dated Oct. 5, 2012; U.S. Appl. No. 11/592,819, All Pages.
Van Dyke, et al.; Notice of Allowance Dated Jan. 24, 2013; U.S. Appl. No. 11/592,819, All Pages.
Glasco, et al.; Notice of Allowance Dated Mar. 7, 2013; U.S. Appl. No. 11/591,629, All Pages.
Glasco, et al.; Notice of Allowance Dated Mar. 18, 2013; U.S. Appl. No. 11/588,177. All Pages.
Lingfeng Yuan; Notice of Allowance Dated Jan. 17, 2013; U.S. Appl. No. 11/591,856, All Pages.
Notice of Allowance dated May 8, 2013; U.S. Appl. No. 11/591,685; Inventor: Glasco, D.; Application Filed Nov. 1, 2006, pp. 1-9.
Notice of Allowance dated Aug. 1, 2013; U.S. Appl. No. 11/591,685; Inventor: Glasco, D.; Application Filed Nov. 1, 2006, pp. 1-10.
Notice of Allowance dated May 10, 2013; U.S. Appl. No. 12/650,068; Inventor: Glasco, D.; Application Filed Dec. 30, 2009, pp. 1-9.
Notice of Allowance dated Jul. 29, 2013; U.S. Appl. No. 12/650,068; Inventor: Glasco, D.; Application Filed Dec. 30, 2009, pp. 1-9.
Notice of Allowance dated May 23, 2013; U.S. Appl. No. 11/591,857; Inventor: Glasco, D.; Application Filed Dec. 1, 2006, pp. 1-9.
Final Office Action dated Jun. 6, 2013; U.S. Appl. No. 11/592,106; Inventor: Glasco, D.; Application Filed Nov. 1, 2006, pp. 1-16.
Office Action dated Oct. 3, 2013; U.S. Appl. No. 11/592,106; Inventor: Glasco, D.; Application Filed Nov. 1, 2006, pp. 1-16.
Notice of Allowance dated May 16, 2013; U.S. Appl. No. 11/523,950; Inventor: Glasco, D.; Application Filed Sep. 19, 2006, pp. 1-2.
Notice of Allowance dated Aug. 26, 2013; U.S. Appl. No. 11/586,826; Inventor: Glasco, D.; Application Filed Nov. 24, 2006, pp. 1-6.
Notice of Allowance dated May 18, 2013; U.S. Appl. No. 11/592,819; Inventor: Glasco, D.; Application Filed , Nov. 2, 2006, pp. 1-7.

(56) References Cited

OTHER PUBLICATIONS

Notice of Allowance dated Aug. 1, 2013; U.S. Appl. No. 11/592,819; Inventor: Van Dyke, J.; Application Filed Nov. 2, 2006, pp. 1-8.
Notice of Allowance dated Jul. 30, 2013; U.S. Appl. No. 11/591,629; Inventor: Glasco, D.; Application Filed Nov. 1, 2006, pp. 1-6.
Office Action dated Sep. 10, 2013; U.S. Appl. No. 111/592,780; Inventor: Glasco, D.; Application Filed Nov. 3, 2006, pp. 1-6.
Notice of Allowance dated Sep. 12, 2013; U.S. Appl. No. 11/588,177; Inventor: Glasco, D.; Application Filed Oct. 24, 2006, pp. 1-6.
Notice of Allowance dated Apr. 30, 2013; U.S. Appl. No. 11/591,856; Inventor: Yuan, R.; Application Filed Nov. 1, 2006, pp. 1-9.

* cited by examiner

MEMORY ACCESS TECHNIQUES PROVIDING FOR OVERRIDE OF A PAGE TABLE

CROSS-REFERENCE TO RELATED APPLICATIONS

This application claims priority to U.S. patent application Ser. No. 11/295,355 filed Dec. 5, 2005, which is incorporated herein by reference in its entirety.

BACKGROUND OF THE INVENTION

Computing devices have made significant contributions toward the advancement of modern society and are utilized in a number of applications to achieve advantageous results. Numerous devices, such as personal computers, servers, hand-held devices, distributed computer systems, calculators, audio devices, video equipment, and telephone systems, have facilitated increased productivity and reduced costs in analyzing and communicating data in most areas of business, science, education and entertainment.

Computing device-readable media (e.g., memory) are usually an important component of a number of computing devices. Computing device-readable media typically store information utilized by a system in performance of a number of different tasks. Other components of a system typically request access to memory in order to retrieve (e.g., "read") information from and store (e.g., "write") information in the memory. Different types of memories (e.g., mass storage, main memory, removable memory and the like) and/or memory "spaces" (e.g., virtual, physical) can be utilized to support information storage.

Different types of computing device-readable media can potentially offer different features, such as storage capacity and access speed. Traditionally, memories that have relatively large storage capacity have relatively slow access speeds. Systems that have relatively fast access speeds, in contrast, typically have relatively small storage capacities. For example, primary memories (e.g., main memory) are relatively fast compared to secondary memories (e.g., mass storage memory) but typically store less information. In view of the tradeoffs, a number of systems transfer chunks of information between relatively fast small memories and relatively slow bulk memories to attempt to optimize speed and capacity.

Another technique for optimizing performance in computing devices is to utilize virtual and physical address spaces. Virtual address space allows applications to utilize as much memory as needed without regard to the memory utilization of other applications. The application retrieves and stores instructions and data utilizing virtual addresses, and the memory system retrieves and stores instruction and data in physically memory using physical addresses to optimize performance. Accordingly, translation between the virtual memory space addressing and physical memory space addressing is performed by the computing system. As a result, applications and data may be moved within memory and between different types of memory. However, applications use the same virtual address regardless of the true physical address.

SUMMARY OF THE INVENTION

Embodiments of the present invention are directed toward memory access techniques that include overriding the page table data structure and translation lookaside buffer (TLB). In one embodiment, a method of accessing memory includes receiving a memory access request. In response to receiving the memory access request a given context specifier is accessed to generate a virtual address, to check a state a page table entry override indicator and to get an adjustment. If the page table entry override indicator is in a first state, a physical address is generated from the virtual address utilizing the adjustment in the context specifier. However, if the page table entry override indicator is in a second state, the physical address is instead translated from the virtual address using a page table data structure or a TLB.

In another embodiment, a method of accessing memory includes receiving a memory access request. A given context specifier is accessed to get a base address, a page table entry override indicator and an adjustment. A virtual address is generated from the offset in the memory access request and the base address in the given context specifier. The state of the page table entry override indicators is also cached. A physical address may be generated from the virtual address if the page table entry override indicator is in a given state. Otherwise, the virtual address is translated to a physical address using a TLB or page table data structure.

In yet another embodiment, a memory access system includes a memory management unit having a segmentation unit and a paging unit. The segmentation unit is adapted to receive a memory access request and access a given context specifier. The segmentation unit is also adapted to generate a virtual address. The segmentation unit is further adapted to generate a virtual address and then translate a virtual address to a physical address utilizing an adjustment in the given context specifier if a page table entry override indicator in the given context specifier is in a first state. If the page table entry override indicator is in a second state, the paging unit instead translates the virtual address to a physical address utilizing a TLB or page table data structure.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
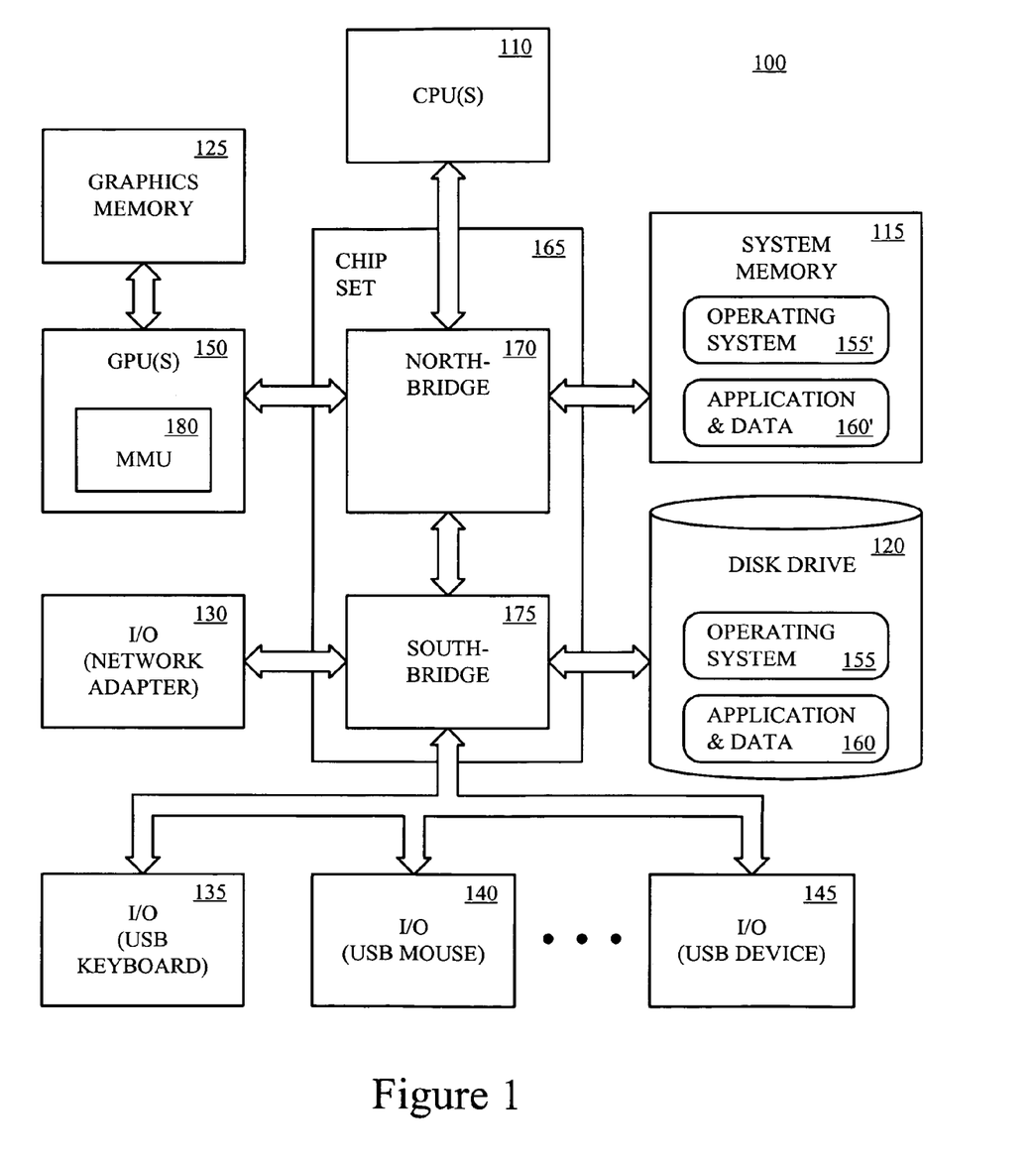
FIG. 1 shows a block diagram of an exemplary computing device for implementing embodiments of the present invention.

Referring to FIG. 1, an exemplary computing device 100 for implementing embodiments of the present invention is shown. The computing device 100 may be a personal computer, server computer, client computer, laptop computer, hand-held device, minicomputer, mainframe computer, distributed computer system or the like. The computing device 100 includes one or more processors (e.g., CPU) 110, one or more computing device-readable media 115, 120, 125 and one or more input/output (I/O) devices 130, 135, 140, 145. The I/O device 130, 135, 140, 145 may include a network adapter (e.g., Ethernet card), CD drive, DVD drive and/or the like, and peripherals such as a keyboard, a pointing device, a speaker, a printer, and/or the like. The computing device 100 may also include one or more specialized processors, such as a graphics processing unit (GPU) 150.

The computing device-readable media 115, 120, 125 may be characterized as primary memory and secondary memory. Generally, the secondary memory, such as a magnetic and/or optical storage, provides for non-volatile storage of computer-readable instructions and data for use by the computing device 100. For instance, the disk drive 120 may store the operating system (OS) 155 and applications and data 160. The primary memory, such as the system memory 115 and/or graphics memory 125, provides for volatile storage of computer-readable instructions and data for use by the computing device 100. For instance, the system memory 115 may temporarily store a portion of the operating system 155' and a portion of one or more applications and associated data 160' that are currently used by the CPU 110, GPU 150 and the like.

The computing device-readable media 115, 120, 125, I/O devices 130, 135, 140, 145, and GPU 150 may be communicatively coupled to the processor 110 by a chip set 165 and one or more busses. The chipset 165 acts as a simple input/output hub for communicating data and instructions between the processor 110 and the computing device-readable media 115, 120, 125, I/O devices 130, 135, 140, 145, and GPU 150. In one implementation, the chipset 165 includes a northbridge 170 and southbridge 175. The northbridge 170 provides for communication with the processor 110 and interaction with the system memory 115. The southbridge 175 provides for input/output functions.

The graphic processing unit 150 may include a memory management unit (MMU) 180 for managing the transfer of data and instructions. However, in other embodiments the MMU 180 may be an independent circuit, a part of the chip set 165, a part of the primary or secondary memory, and/or other element in the computing device.

The MMU 180 translates virtual addresses to physical addresses for each of a plurality of contexts. In one implementation, the MMU 180 translates the virtual address to a physical address using an address translation data structure. In another implementation, a context specifier may override the virtual-to-physical page mapping and/or attributes in the address translation data structure. In particular, the virtual address may be translated directly to a physical address using an adjustment specified in the context specifier. In such an implementation, one or more attributes of the context specifier may override the same attributes stored in a page table data structure or cached locally in a translation lookaside buffer (TLB). In yet another implementation, the page table data structure may be utilized to translate the virtual address to a given physical address and the attributes contained in the context specifier that override the same attributes contained in the page table data structure or TLB.

Figure 2:
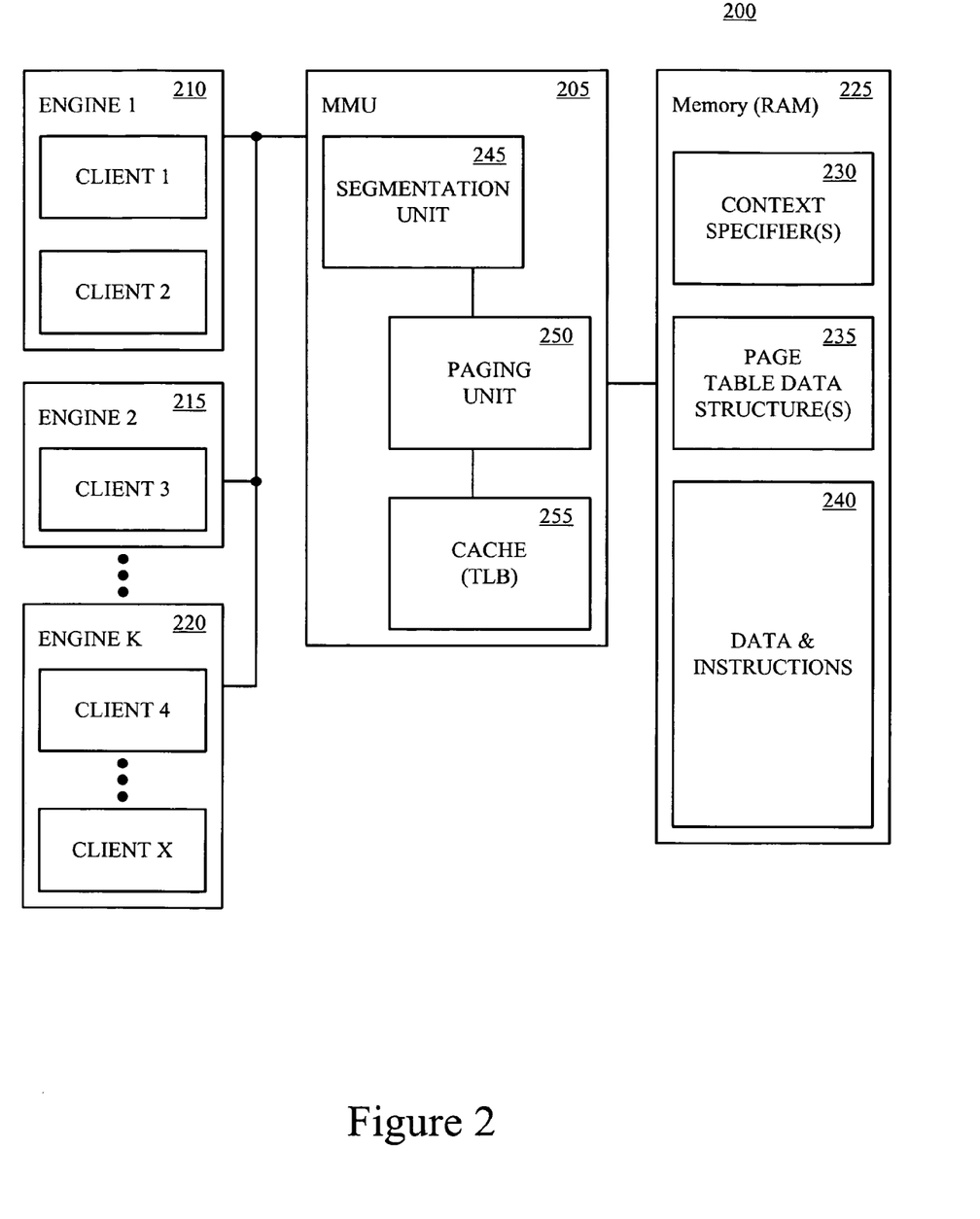
FIG. 2 shows a block diagram of a memory access system, in accordance with one embodiment of the present invention.

Referring now to FIG. 2, a memory access system 200, in accordance with one embodiment of the present invention, is shown. The memory access system 200 includes a memory management unit (MMU) 205 coupled between one or more engines 210, 215, 220 and a separate computing-device readable media, such as random access memory (RAM) 225. Each engine 210, 215, 220 may include on or more clients. Typically the path between the engines 210, 215, 220 and the MMU 205 includes a write path and a read path.

The computing device-readable media 225 may store a plurality of context specifiers 230, a portion of an address translation data structure such as one or more page table data structures 235, and data and instructions 240. The MMU 205 includes a segmentation unit 245, a paging unit 250, and a cache 255. The cache 255 may store virtual-to-physical page mappings for recently accessed pages in a translation lookaside buffer (TLB).

The segmentation unit 245 is adapted to receive a memory access request for any client (e.g., Client_3) and generate a virtual address from the memory access request. The segmentation unit 245 and/or paging unit 250 then translates the virtual address to a physical address.

In one implementation, the virtual address is generated and translated to a physical address utilizing a given context specifier and a given mapping stored in a page table data structure 235 or cached 255 in the TLB. In another implementation, the virtual address is generated and translated to a physical address utilizing the given context specifier, thereby bypassing the page table data structure 235 and TLB 255. In addition or alternatively, the value of attributes specified in the given context specifier may or may not override attributes specified in the applicable page table entry of the page table data structure 235 or TLB 255 depending upon one or more conditions.

Figure 3:
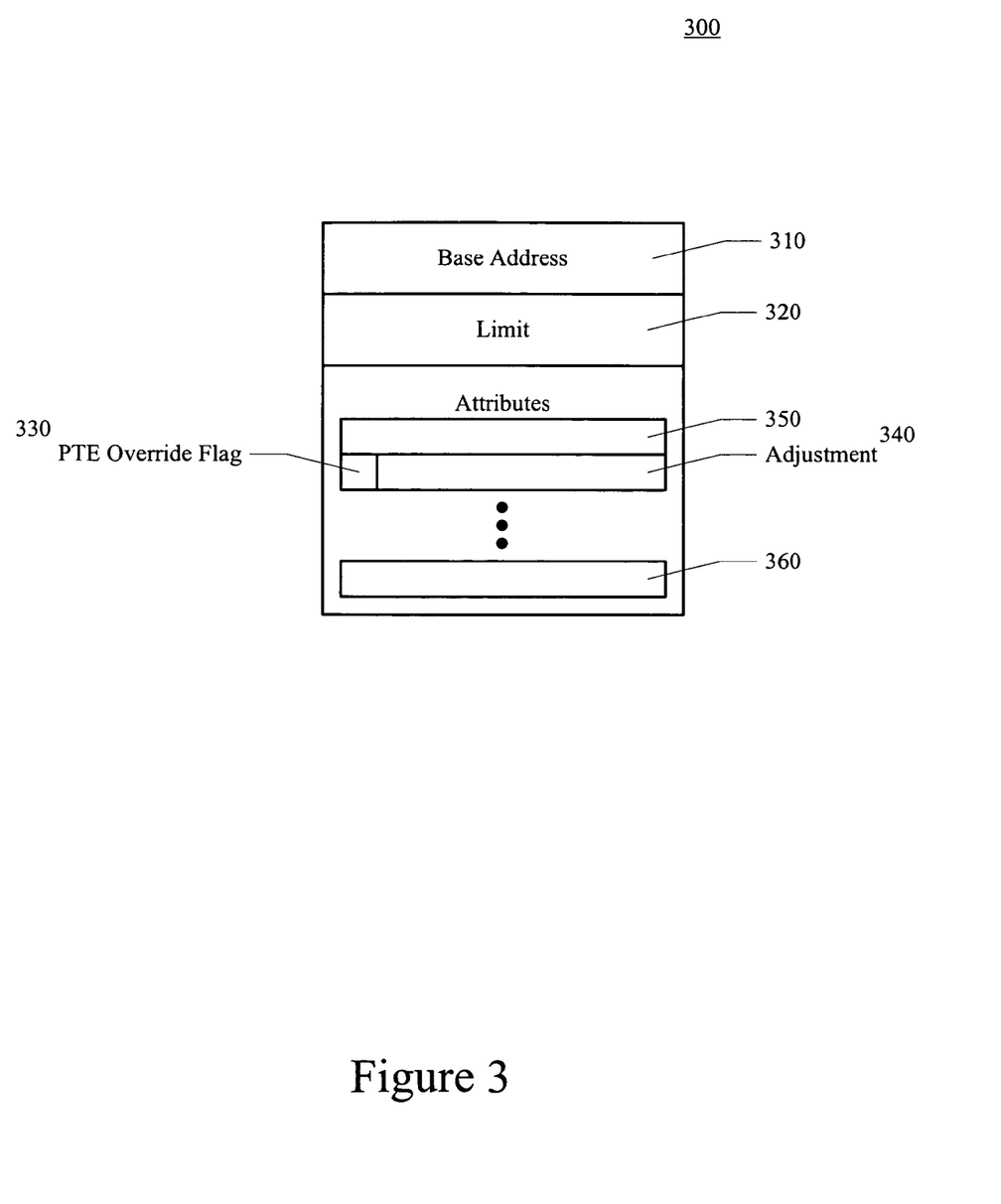
FIG. 3 shows a block diagram of a context specifier, in accordance with one embodiment of the present invention.

Referring now to FIG. 3, a context specifier 300, in accordance with one embodiment of the present invention, is shown. The context specifier 300 is a data structure that stores a base address 310, a limit 320, a PTE override indicator 330, an adjustment 340 and one or more other attributes 350, 360. The PTE override indicator 330 may be stored in one or more bits and the adjustments 340 may be stored as a plurality of bits. The PTE override indicator bits may be used to specify whether the virtual address should be translated directly to a physical address by adding the adjustment 340 to the virtual address, or whether the virtual address should be translated to a physical address using an appropriate PTE in a TLB or page table data structure. More specifically, if the PTE override indicator 330 is in a first state, the virtual address may be generated by adding the offset in the memory access request to the base address 310 in the context specifier 300. The virtual address may then be translated to the physical address utilizing an appropriate PTE in the TLB or page table data structure. If the PTE override indicator 330 is in a second state, the physical address may be generated directly by adding the offset in the memory access request to the base address 310 and the adjustment 340 in the context specifier 300.

The PTE override indicator may also be used to specify whether the value of one or more attributes in the context specifier should override the corresponding attributes in the appropriate PTE or whether the value of the attributes specified in the appropriate PTE should be utilized when translating from the virtual address to the physical address and/or accessing the computing device-readable media at the physical address.

Figure 4:
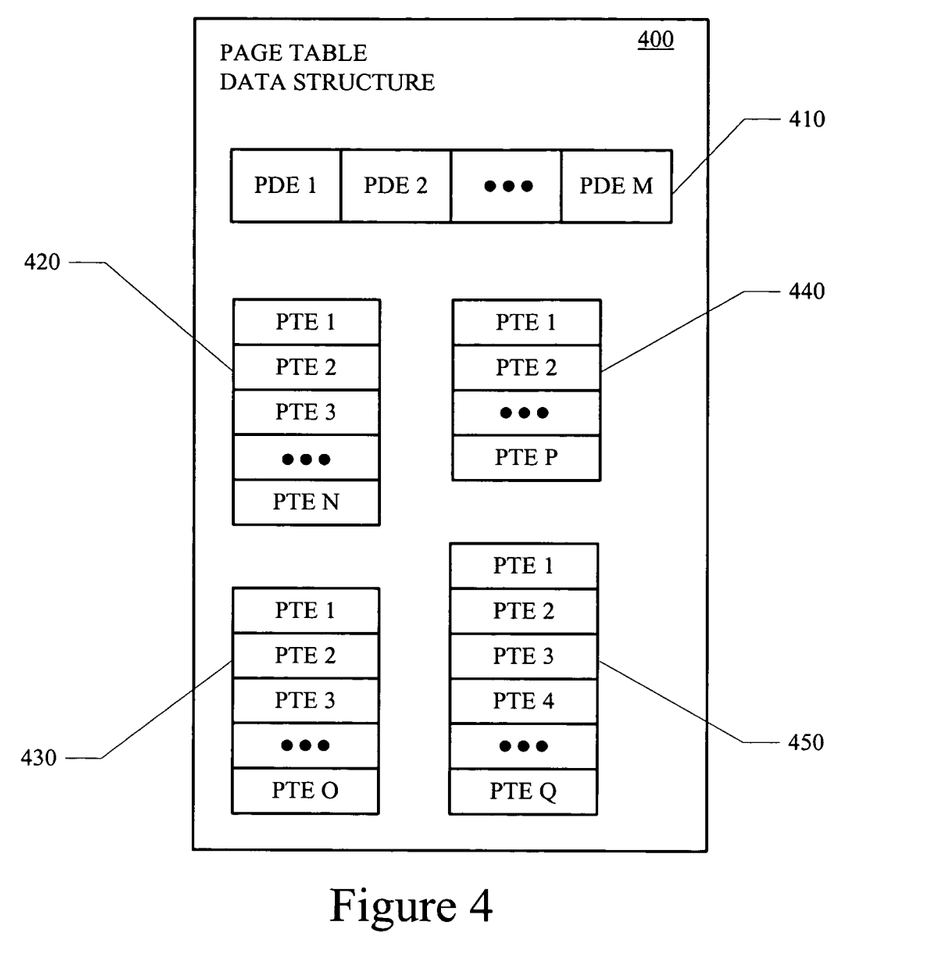
FIG. 4 shows a block diagram of a page table data structure, in accordance with one embodiment of the present invention.
Figure 5:
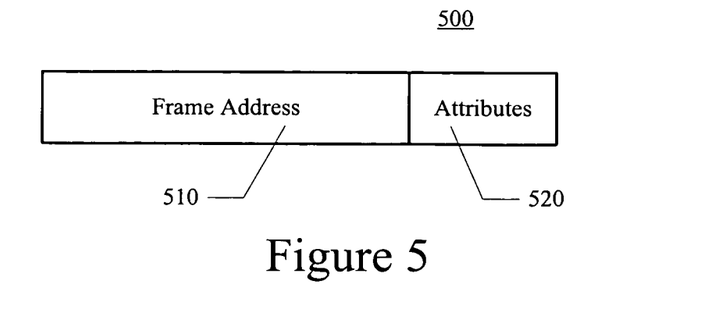
FIG. 5 shows a block diagram of a page table entry, in accordance with one embodiment of the present invention.

Referring now to FIG. 4, a page table data structure 400, in accordance with one embodiment of the present invention, is shown. The illustrated two-level page table data structure 400 may include a page directory 410 and one or more page tables 420-450. The page directory 410 includes a plurality of page directory entries (PDE). Each PDE includes the address of a corresponding page table 420-450. Each PDE may also include a plurality of attributes. Each page table 420-450 includes one or more page table entries (PTE). Each PTE 500 includes a corresponding frame number (e.g., physical page number) 510, as illustrated in FIG. 5. Each PTE may also include a plurality of attributes 520, such as a dirty bit, an accessed bit, a page check disable bit, a page write transparent bit, a user accessible bit, a writeable bit, a present bit, a referenced bit, a hash function identification bit, a valid bit, an address compare bit, a changed bit, storage control bits, a no-execute bit, page protection bits, page kind bits and/or the like. One or more of the attributes in the PDE and/or PTE may be the same attributes contained in the context specifier 300.

Figure 6:
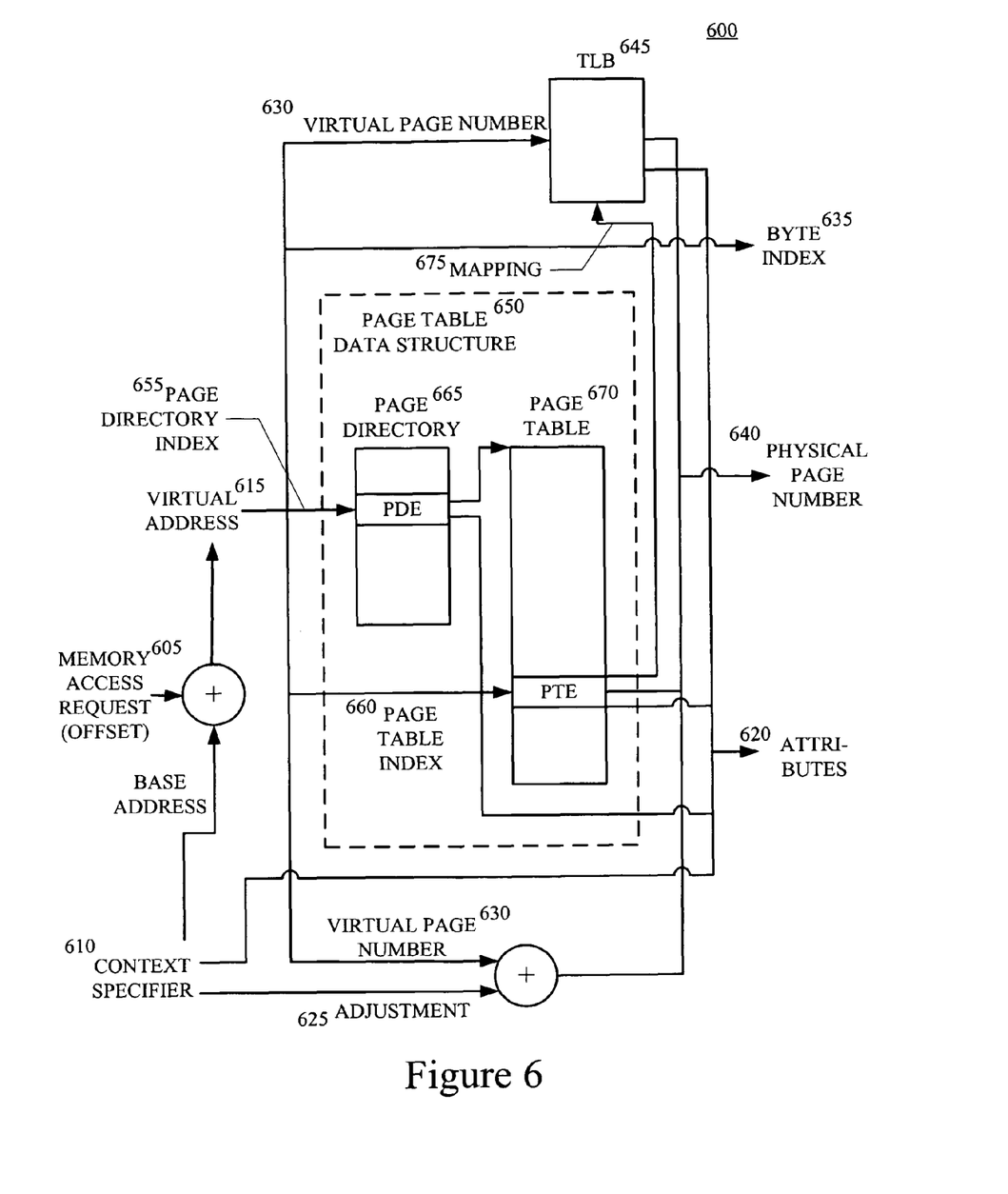
FIG. 6 shows a block diagram of a technique for generating physical addresses for memory access requests, in accordance with one embodiment of the present invention.

Referring now to FIG. 6, a technique for translating virtual addresses to physical addresses, in accordance with one embodiment of the present invention, is shown. Upon receipt of a memory access request 605 a context specifier 610 is accessed and a virtual address is generated 615. The virtual address 615 is generated from an offset in the memory access request 605 and a base address in the context specifier 610. The context specifier 610 also includes one or more attributes 620 that may include a PTE override attribute and an adjustment 625. The virtual address 615 includes a virtual page number 630 and a byte index 635.

If the PTE override attribute of the context specifier 610 is set to a first state the virtual page number 630 may be combined with the adjustment 625 of the context specifier 610 to generate the physical page number 640 as depicted in FIG. 6. The attributes 620 of the context specifier 610 are also used to generate the physical address 640 and/or used in accessing the memory at the physical address 640.

If the PTE override attribute is set to a second state, the virtual address 615 is translated using either a TLB 645 or a page table data structure 650. In particular, if a TLB 645 includes a valid virtual-to-physical page mapping for the virtual page number 630 (e.g., TLB hit) the appropriate physical page number 640 is output from the TLB 645. When the virtual page number 630 is mapped to a given physical page number 640 using the TLB 645, the attributes used in the address translation process and/or used in accessing the memory may be the attributes 630 contained in the TLB 645 or attributes contained in the context specifier 610.

If the TLB 645 does not include a valid mapping (e.g., TLB miss), the virtual address 615 is translated using the page table data structure 650. More specifically, the virtual page number 630 includes a page directory index 655 and a page table index 660. The page directory index 655 in the virtual address 615 is used to index a given page directory 665. The page directory entry (PDE) indexed by the page directory index 655 includes an address of a given page table 670. The page table index 660 in the virtual address 615 is used to index the given page table 670 located at the address specified in the PDE. The page table entry (PTE) indexed by the page table index 660 includes the physical page number 640. The resulting mapping 675 may then be cached in the TLB 645 for translating virtual addresses to physical addresses in subsequent memory access requests.

When the virtual page number 630 is translated to a given physical page number 640 using the page table data structure 650, the attributes 620 used in the address translation process and/or used in accessing the memory may be attributes specified in the given PDE and/or PTE, or attributes contained in the context specifier 610.

Figure 7:
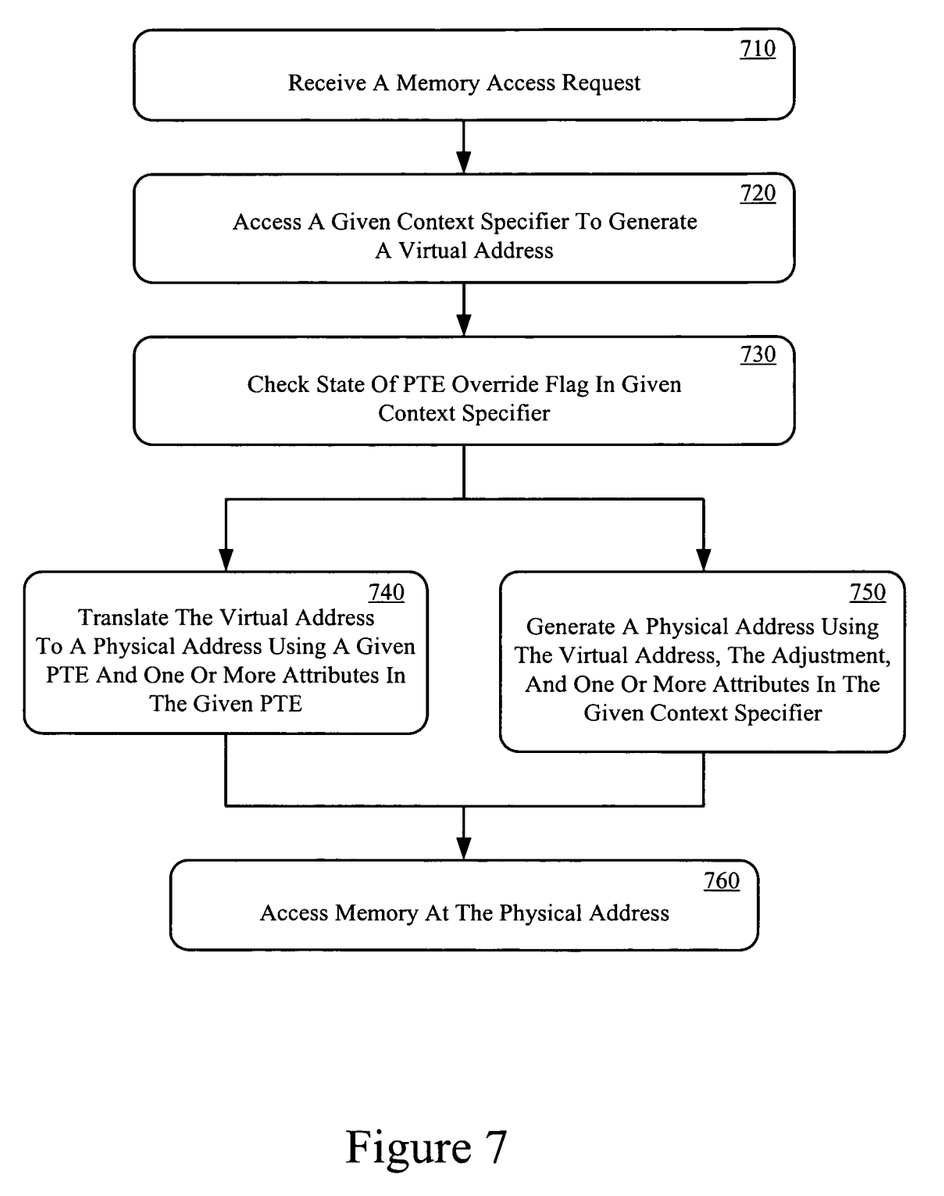
FIG. 7 shows a flow diagram of a method of translating virtual addresses to physical addresses utilizing an adjustment specified in a given context specifier, in accordance with one embodiment of the present invention.

Referring now to FIG. 7, a method of translating virtual addresses to physical addresses utilizing an adjustment specified in a given context specifier, in accordance with one embodiment of the present invention, is shown. The method includes receiving a memory access request, at 710. The memory access request may be a read operation or a write operation. At 720, a given context specifier is accessed to generate a virtual address from an offset contained in the memory access request and a base address contained in the context specifier. The given context specifier also includes a PTE override indicator and an adjustment.

At 730, the state of the PTE override indicator in the given context specifier is checked. If the PTE override indicator is set to a first state the virtual address is translated to a physical address utilizing a page table data structure or TLB. More specifically, the virtual page number is translated to a physical page number using a given PTE contained in either the TLB or page table data structure, at 740. In addition, the translation of the virtual page number to the physical page number includes utilizing the value of one or more other attributes specified in the PTE.

If the PTE override indicator is set to a second state the virtual address is translated to a physical address utilizing the given context specifier. More specifically, a physical page number is generated utilizing the virtual page number and the adjustment specified in the given context specifier, at 750. In addition, the generation of the virtual page number directly to the physical page number includes utilizing the value of one or more attributes specified in the given context specifier. Accordingly the translation process bypasses use of the TLB and page table data structure.

At 760, the computing device-readable media at the physical address is accessed. For example, data received from a client may be stored in the computing device-readable media at the location within the physical page number specified by a byte index of the virtual address in response to a write request. In response to a read request, data stored at the byte index within the physical page number of the computing device-readable media can be retrieved for the client.

Figure 8:
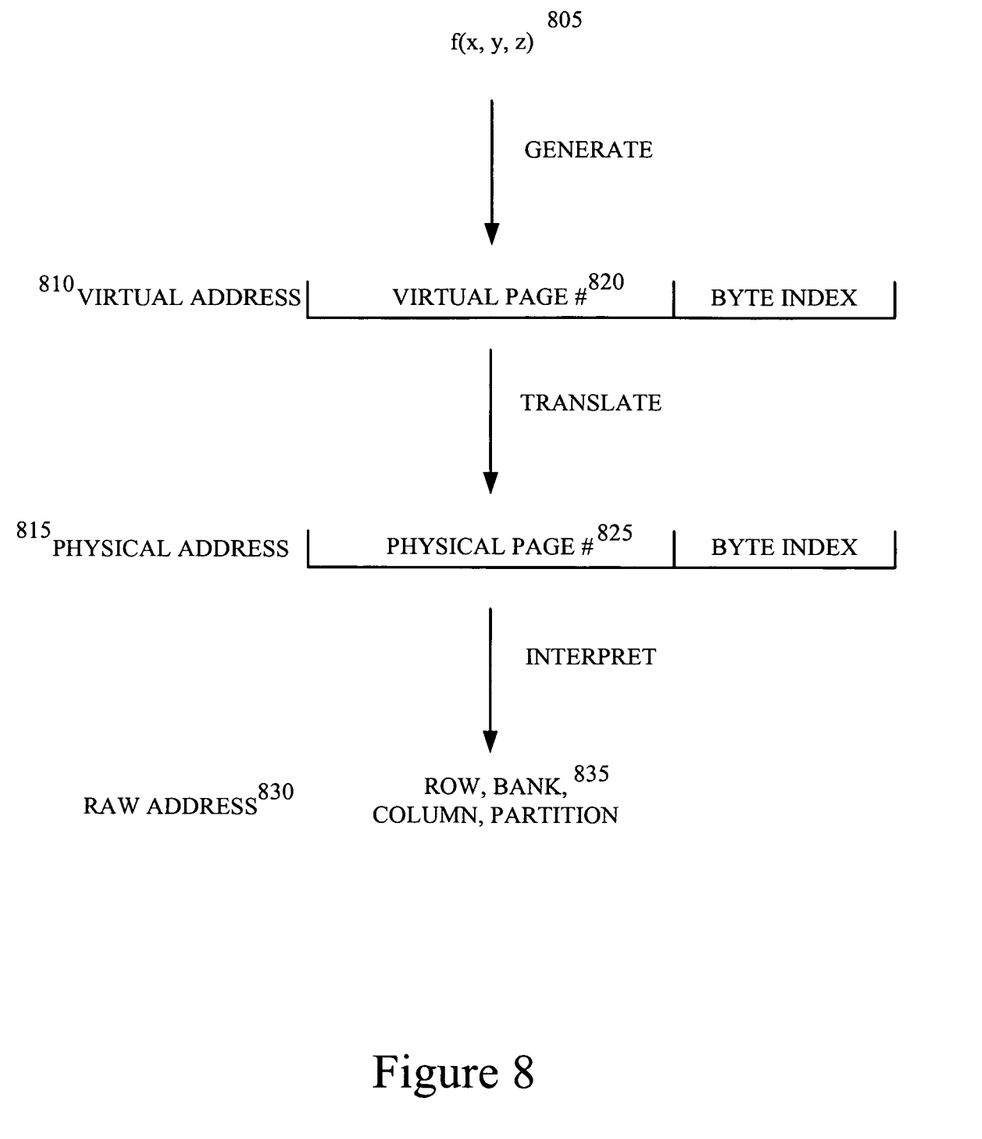
FIG. 8 shows a block diagram of a translating virtual address to raw address, in accordance with one embodiment of the present invention.

Generally, the computing device-readable media is accessed using a raw address instead of the physical address. The raw address may typically be specified in terms of column, bank, row and partition numbers. Referring now to FIG. 8, a block diagram of translating virtual address to raw address, in accordance with one embodiment of the present invention, is shown. As depicted in FIG. 8, the address translation is performed as a chain of translations. In a graphics implementation, a surface coordinate (x, y) or (x, y, z) 805 is translated to a virtual address 810. The virtual address 810 is translated to a physical address 815 utilizing an adjustment specified in a given context specifier or a given PTE determined from the TLB or page table data structure. Typically the upper bit of the virtual address containing a virtual page number 820 are translated to a physical page number 825 and the lower bits are copied straight through. An interpretation of the physical address 815 then provides the raw address 830 in the form of column, bank, row and partition numbers.

The translation of the virtual address to the physical address and the interpretation of the physical address to determine the raw address is performed in accordance with the attributes specified in the given context specifier, the attributes specified in the given PTE, or one or more attributes specified in the given PTE and one or more attributes specified in the given context specifier that override corresponding attributes in the given PTE. For example, a page kind attribute in the given context specifier and given PTE provide information on the organization of graphics data for use in interpreting the physical address to determine the raw address. Such formatting may include the number of bits used to store a particular type of data, the tile format and organization of data within a tile, whether data swizzling is performed, anti-aliasing attributes, fixed-point or floating-point data representation, access privileges and/or the like. For example, an attribute may be used to specify a packing mode used to store either z data or color data to optimize performance of raster operations (ROPs). In another example, an attribute may specify whether data is compressible or uncompressible.

Figure 9:
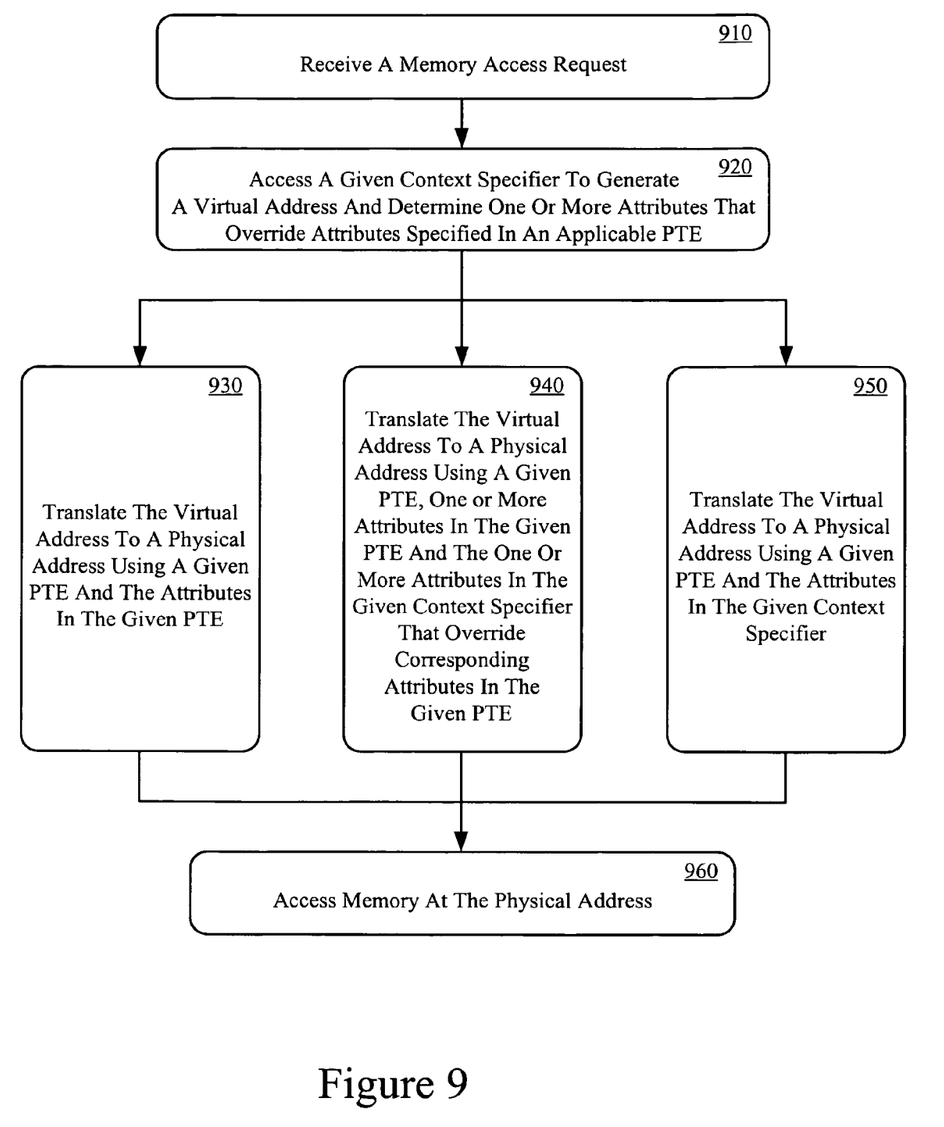
FIG. 9 shows a flow diagram of a method of translating virtual addresses to physical addresses utilizing attributes specified in a given context specifier or a given page table entry, in accordance with one embodiment of the present invention.

Referring now to FIG. 9, method of accessing a computing device-readable media utilizing attributes specified in a given context specifier or a given page table entry, in accordance with one embodiment of the present invention, is shown. The method includes receiving a memory access request, at 910. The memory access request may be a read operation or a write operation. At 920, a given context specifier is accessed to generate a virtual address. The given context specifier also includes one or more attributes. The attributes in the context specifier may override all attributes in the PTE or selectively override one or more of the attributes in the applicable PTE.

More specifically, the virtual address may be translated to a physical address using a given PTE and the attributes specified in the given PTE, at 930. The attributes specified in the given PTE may also be utilized to service other aspects of the memory access request. For example, one or more attributes in the PTE may be utilized to interpret the raw address from the physical address, such as whether the data is compressed, packing, pixel processing and/or the like.

In another instance, the virtual address may be translated to a physical address using one or more attributes in the given PTE and one or more attributes in the given context specifier that override corresponding attributes in the given PTE, at 940. For example, a given attribute in the context specifier may be encoded such that one of the values indicates that the corresponding attribute value in the page table entry (PTE) is to be used. However, another attribute in the context specifier may be encoded with a particular attribute value and therefore the attribute in the context specifier overrides the attribute in the PTE. Thus, the attribute values in the PTE may be individually overridden by the corresponding attribute in the context specifier. In addition, a combination of one or more attributes specified in the given PTE and attributes specified in the given context specifier that override corresponding attributes in the given PTE may be utilized to service other aspects of the memory access request.

In yet another instance, the virtual address may be translated to a physical address using the given PTE and the attributes in the given context specifier, at 950. For example, a bit in a PTE override indicator may specify that the attributes in the context specifier override all corresponding attributes in the PTE. In such instance, the attributes specified in the given context specifier are also utilized to service other aspects of the memory access request. Accordingly the translation process bypasses use of the TLB and page table data structure.

At 960, the computing device-readable media at the physical address is accessed. For example, data received from a client may be stored in the computing device-readable media at the location within the physical page number specified by a byte index of the virtual address in response to a write request. In response to a read request, data stored at the byte index within the physical page number of the computing device-readable media can be retrieved for the client.

Again, the raw address (e.g., row, column, band and partition) for accessing the computing device-readable media may be interpreted from the physical address using one or more of the attributes in the context specifier, the PTE, or both. The attributes used to interpret the raw address from the physical address may for example specify the compression type for graphics data, the mode for storing graphics data in tiles across partitions, a packing mode for packing graphics data in tiles, a data swizzling mode used to swizzle tile data, a sample format for performing anti-aliasing, a mapping to a block-linear memory format, and the like. For example, the page kind attribute selects one of many available address mapping techniques for each page to improve locality of small-size accesses and therefore improve performance.

Figure 10:
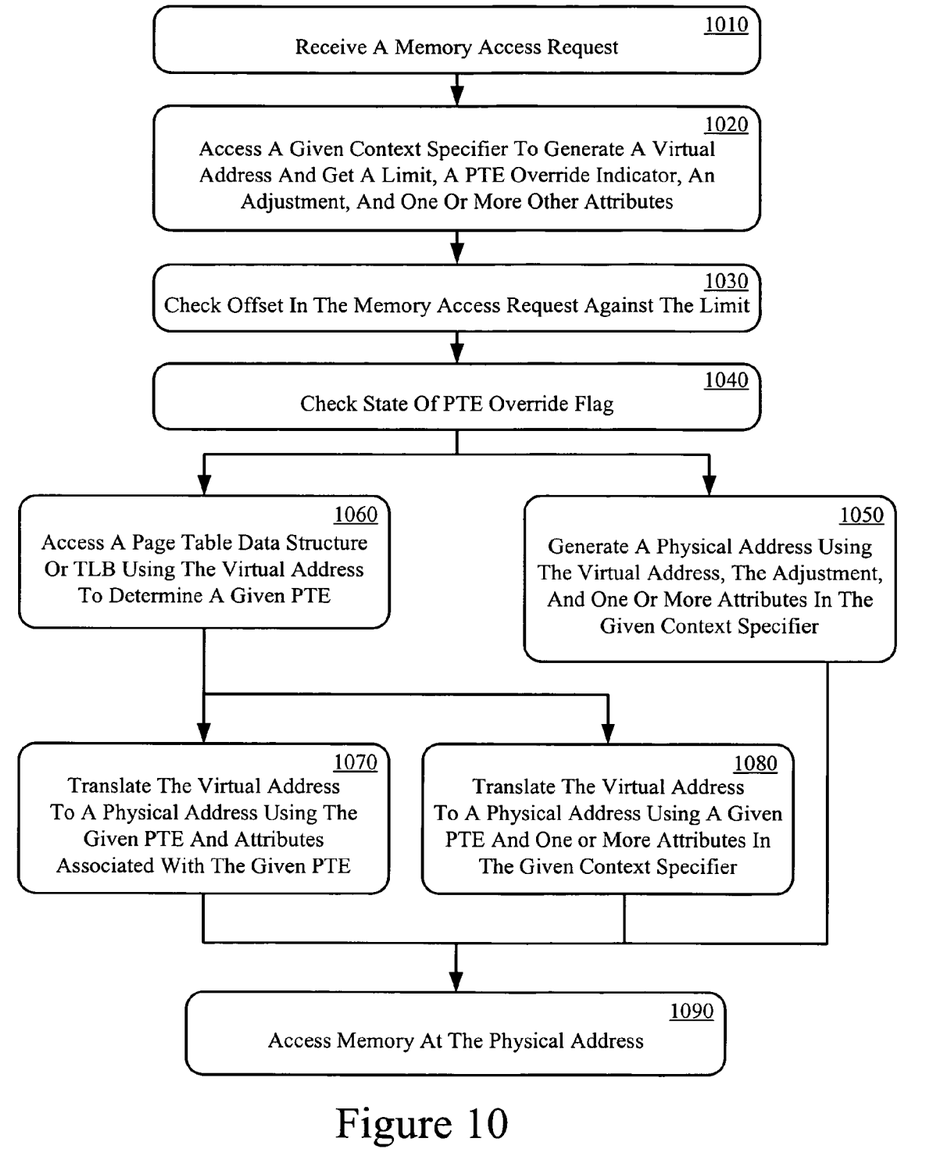
FIG. 10 shows a flow diagram of a method of translating virtual addresses to physical addresses, in accordance with another embodiment of the present invention.

Referring now to FIG. 10, a method of translating virtual addresses to physical addresses, in accordance with one embodiment of the present invention, is shown. The method includes receiving a memory access request, at 1010. The memory access request may be a read operation or a write operation. At 1020, a given context specifier is accessed to generate a virtual address from an offset contained in the access request and a base address in the context specifier. The context specifier is also accessed to get a limit, a PTE override indicator, an adjustment and one or more attributes. At 1030, the offset contained in the memory access request is checked against a limit contained in the given context specifier. If the offset is greater than the limit, a limit violation is returned back to the client.

At 1040, the state of the PTE override indicator is checked. If the first bit of the PTE override flag is set to a given state the virtual address is translated to a physical address utilizing the given context specifier. More specifically, a physical page number is generated utilizing the virtual page number and the adjustment, at 1050. In addition, the translation of the virtual page number directly to the physical page number includes utilizing the value of the attributes specified in the context specifier. Accordingly the translation process bypasses use of the TLB and page table data structure.

If the first bit of the PTE override indicator is set to another state the virtual address is translated to a physical address utilizing a page table data structure or TLB. In addition, a second bit of the PTE override indicator may specify whether or not the value of the attributes contained in the context specifier override the corresponding attributes contained in the appropriate PDE and/or PTE of the TLB or page table data structure. More specifically, a TLB or page table data structure may be accessed, at 1060, using the virtual address to determine a given PTE. At 1070, the virtual address is translated to a physical address using the given PTE contained in either the TLB or page table data structure and attributes associated with the PTE, if the second bit of the PTE override indicator is set to a first state. If the second bit of the PTE override indicator is set to a second state, the virtual address is translated to a physical address using the given PTE contained in either the TLB or page table data structure and attributes associated with the given context specifier, at 1080. In one implementation, all of the attributes associated with the given context specifier override all of the attributes associated with the PTE. In another implementation, an encoded value of each particular attribute in the context specifier may indicate that the corresponding attribute value in the PTE is to be used instead. Thus, the attribute values in the PTE may be individually overridden by the corresponding attribute in the context specifier.

At 1090, the computing device-readable media at the physical address is accessed. For example, data received from a client may be stored in the computing device-readable media at the location within the physical page number specified by a byte index of the virtual address in response to a write request. In response to a read request, data stored at the byte index within the physical page number of the computing device-readable media can be retrieved for the client. Again, the raw address (e.g., row, column, band and partition) for accessing the computing device-readable media may be interpreted from the physical address using one or more of the attributes in the context specifier, the PTE, or both depending upon the state of the PTE override indicator or the corresponding encoded attribute value in the context specifier. The attributes used to interpret the raw address from the physical address may for example specify the compression type for graphics data, the mode for storing graphics data in tiles across partitions, a packing mode for packing graphics data in tiles, a data swizzling mode used to swizzle tile data, a sample format for performing anti-aliasing, a mapping to a block-linear memory format, and the like. The packing mode may for example specify a packing mode for storing Z data and stencil data together, for packing Z data, for packing color data, and the like.

Accordingly, embodiments of the present invention advantageously eliminate memory accesses, associated with determining a TLB hit or walking the page table data structure, by translating virtual addresses directly to physical addresses using context specifiers. Embodiments also allow the given context specifier, which is typically one per surface or data type, to override the underlying page attributes of the TLB or page table data structure as a whole or on an individual basis. Embodiments also allow pages to be shared across clients and/or data types with the context specifier being used to override the page table data structure or TLB to allow different attribute values.

For example, the context specifier override mechanism allows the MMU hardware to avoid fetching or caching page table entries for each page when mapping attributes, such as the page kind information, are specified by the context specifier structure itself. It is the responsibility of kernel/privileged software to take advantage of this capability when possible. The benefits of avoiding the fetch of every page table entry are: (1) reduced latency to fetch the desired data since the system does not need to wait for the page table entry to return from memory if it wasn't already cached; and (2) reduced storage for TLB entries. Thus, the page table fetches can be eliminated in the case of a surface for which the mapping is specified by the context specifier. This includes virtual-to-physical page mapping, and the page attributes including page kind. As such, the virtual-to-physical page mapping can be specified completely by the context specifier structure when it is a single contiguous mapping.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of accessing memory comprising:
   receiving a memory access request;
   accessing a given context specifier to generate a virtual address of the memory access request, to check a state of a page table entry override indicator and to get an adjustment;
   translating the virtual address to a physical address utilizing a translation lookaside buffer or a page table data structure if the page table entry override indicator is in a first state; and
   generating a physical address from the virtual address and the adjustment in the given context specifier if the page table entry override indicator is in a second state.

2. The method according to claim 1, further comprising:
   translating the virtual address to the physical address utilizing one or more attributes specified in the given context specifier if the given context specifier indicates that the one or more attributes contained in the given context specifier override corresponding attributes contained in the translation lookaside buffer or the page table data structure; and
   translating the virtual address to the physical address utilizing the attributes specified in the translation lookaside buffer or page table data structure if the page table entry override indicator indicates that the attributes contained in the given context specifier do not override the corresponding attributes contained in the translation lookaside buffer or the page table data structure.

3. The method according to claim 1, further comprising:
   accessing a computing device-readable media at the physical address utilizing one or more attributes specified in the given context specifier if the given context specifier indicates that the one or more attributes contained in the given context specifier override corresponding attributes contained in the translation lookaside buffer or the page table data structure; and
   accessing the computing device-readable media at the physical address utilizing the attributes specified in the translation lookaside buffer or page table data structure if the page table entry override indicator indicates that the attributes contained in the given context specifier do not override the corresponding attributes contained in the translation lookaside buffer or the page table data structure.

4. The method according to claim 1, further comprising:
   checking an offset of the memory access request against a limit of the context specifier; and
   generating a limit violation if the offset is greater then the limit.

5. A method of accessing memory comprising:
  receiving a memory access request containing an offset;
  accessing a given context specifier for the memory access request to get a base address, a page table entry override indicator and an adjustment;
  generating a virtual address from the offset in the memory request and the base address in the given context specifier;
  checking a state of the page table entry override indicator;
  translating the virtual address to a physical address utilizing a translation lookaside buffer or a page table data structure if the page table entry override indicator is in a first state; and
  generating a physical address from the virtual address and the adjustment in the given context specifier if the page table entry override indicator is in a second state.

6. The method according to claim 5, wherein the memory access request comprises a read operation.

7. The method according to claim 5, wherein the memory access request comprises a write operation.

8. The method according to claim 5, wherein generating the physical address from the virtual address and the adjustment further comprises utilizing one or more attributes contained in the given context specifier if the page table entry override indicator is in the second state.

9. The method according to claim 8, further comprising:
  translating the virtual address to the physical address utilizing one or more attributes specified in the given context specifier if the given context specifier indicates that the one or more attributes contained in the given context specifier override corresponding attributes contained in the translation lookaside buffer or the page table data structure; and
  translating the virtual address to the physical address utilizing the attributes specified in the translation lookaside buffer or page table data structure if the page table entry override indicator indicates that the attributes contained in the given context specifier do not override the corresponding attributes contained in the translation lookaside buffer or the page table data structure.

10. The method according to claim 5, further comprising accessing a computing device-readable media at the physical address.

11. The method according to claim 10, further comprising accessing a computing device-readable media at the physical address using one or more attributes specified in the given context specifier if the page table entry override indicator is in the second state.

12. The method according to claim 11, further comprising:
  accessing the computing device-readable media at the physical address utilizing one or more attributes specified in the given context specifier if the given context specifier indicates that the one or more attributes contained in the given context specifier override corresponding attributes contained in the translation lookaside buffer or the page table data structure; and
  accessing the computing device-readable media at the physical address utilizing the attributes specified in the translation lookaside buffer or page table data structure if the page table entry override indicator indicates that the attributes contained in the given context specifier do not override the corresponding attributes contained in the translation lookaside buffer or the page table data structure.

13. The method according to claim 5, further comprising:
  wherein the given context specifier further includes a limit;
  checking an offset of the memory access request against the limit; and
  generating a limit violation if the offset is greater than the limit.

14. A memory access system comprising:
  a computing-device readable media including a plurality of context specifiers; and
  a memory management unit, communicatively coupled to the computing-device readable media, comprising;
    a segmentation unit to receive a memory access request, to access a given context specifier, to generate a virtual address for the memory access request from the given context specifier, and to translate a virtual address to a physical address utilizing an adjustment in the given context specifier if a page table entry override indicator in the given context specifier is in a given state; and
    a paging unit to translate the virtual address to the physical address utilizing a translation lookaside buffer or a page table data structure if the page table entry override indicator is in another state.

15. The memory access system of claim 14, wherein the given context specifier comprises a data structure for storing a limit, the page table entry override indicator, the adjustment and one or more attributes.

16. The memory access system of claim 14, further comprising the segmentation unit to generate the physical address utilizing one or more attributes contained in the context specifier that override one or more attributes contained in the translation lookaside buffer or page table data structure.

17. The memory access system of claim 14, further comprising the paging unit to translate the virtual address to the physical address utilizing one or more attributes contained in the context specifier that override one or more attributes contained in the translation lookaside buffer or page table data structure.

18. The memory access system of claim 14, further comprising the memory management unit to access the computing device-readable media at the physical address.

19. The memory access system of claim 14, further comprising the memory management unit to access the computing device-readable media at the physical address utilizing one or more attributes contained in the context specifier that override one or more attributes contained in the translation lookaside buffer or page table data structure.

20. The memory access system of claim 14, further comprising the segmentation unit to check an offset contained in the memory access request against a limit contained in the given context specifier and to generate a limit violation if the virtual address is greater than the limit.

* * * * *